United States Patent

[11] 3,560,661

[72] Inventors Stanislas Kobus
Antwerpen, Belgium;
Adelin Eugene Gaston Salle, Paris, France

[21] Appl. No. 758,750
[22] Filed Sept. 10, 1968
[45] Patented Feb. 2, 1971
[73] Assignee International Standard Electric Corporation
New York, N.Y.
a corporation of Delaware
[32] Priority Sept. 22, 1967
[33] Netherlands
[31] 6713017

[54] DIRECTORY NUMBER-EQUIPMENT NUMBER AND EQUIPMENT NUMBER-DIRECTORY NUMBER TRANSLATOR ARRANGEMENT
6 Claims, 13 Drawing Figs.

[52] U.S. Cl. .......... 179/18
[51] Int. Cl. .......... H04q 3/47
[50] Field of Search .......... 179/18TR, 18.19

[56] References Cited

UNITED STATES PATENTS 3,445,602 5/1969 Gitten et al. .......... 179/18(.19)

FOREIGN PATENTS 659,622 8/1965 Belgium .......... 179/18(T)
281,638 3/1968 Australia .......... 179/18(T)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel and Delbert P. Warner

ABSTRACT: The present invention relates to a two-way translator arrangement for an automatic switching system including *n* groups of substation lines, each of the *n* group including a plurality of substation lines, certain ones of the plurality of lines being normal lines having a normal class-of-service and whose directory and equipment numbers are associated by a predetermined systematic relationship and special lines whose directory and equipment numbers are not so associated and/or which have a special class-of-service. The special lines are further divided into first level special lines for which the group number portion of their directory and equipment numbers are associated by a given one-to-one relationship and second level special lines for which the group number portion of their directory and equipment numbers are not so associated. The arrangement includes a detection means addressable by one of the directory and equipment numbers to detect the presence of special lines and produces a control signal in response thereto, a first translation stage including *n* substages each assigned to the first level special lines of a different one of the *n* groups and a second translation stage assigned in common to the second level special lines of all the *n* groups. When the control signal is produced, the one of the *n* substages associated with that one of the *n* groups containing the addressed special line is activated to carry out the required translation and the second translator stage detects the failure of the one of the *n* substages to carry out the required translation because the addressed special line is not one of the first level special lines and to activate the second translator stage to carry out the required translation. In addition, an auxiliary translator stage is coupled to both the first and second translator stages to cooperate therewith in case the addressed line is of a complex class and/or has a transfer of call facility.

Fig. 2. NORMAL/SPECIAL LINE DETECTOR
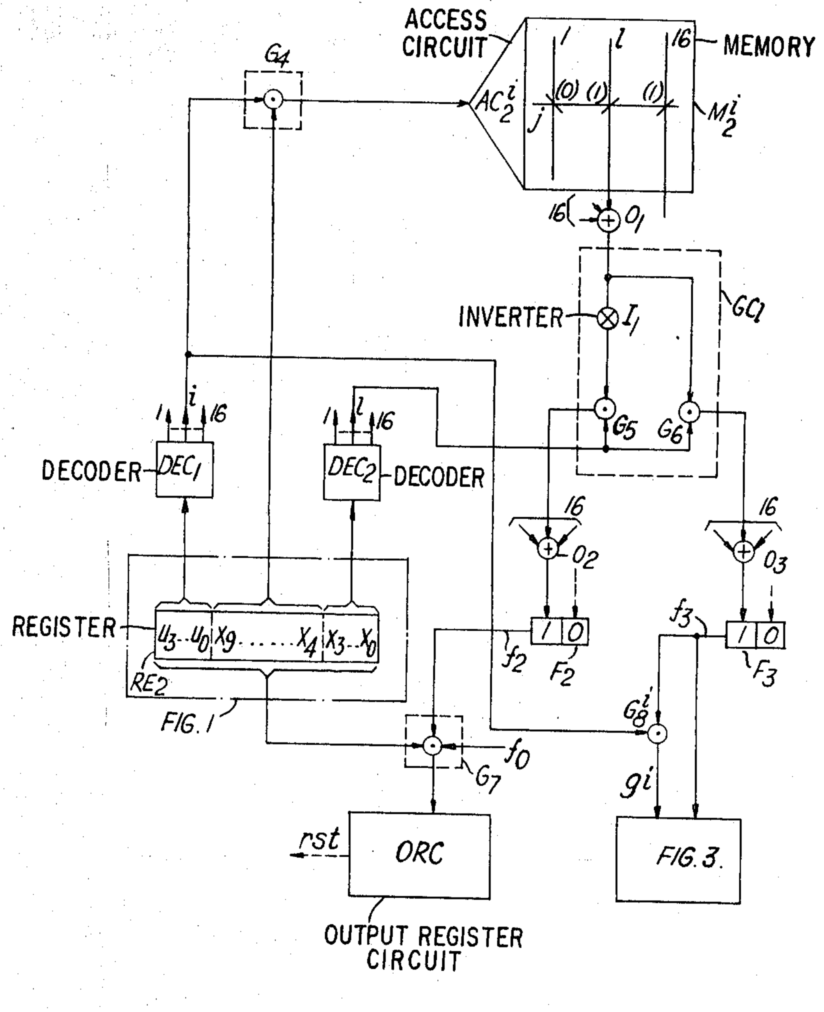

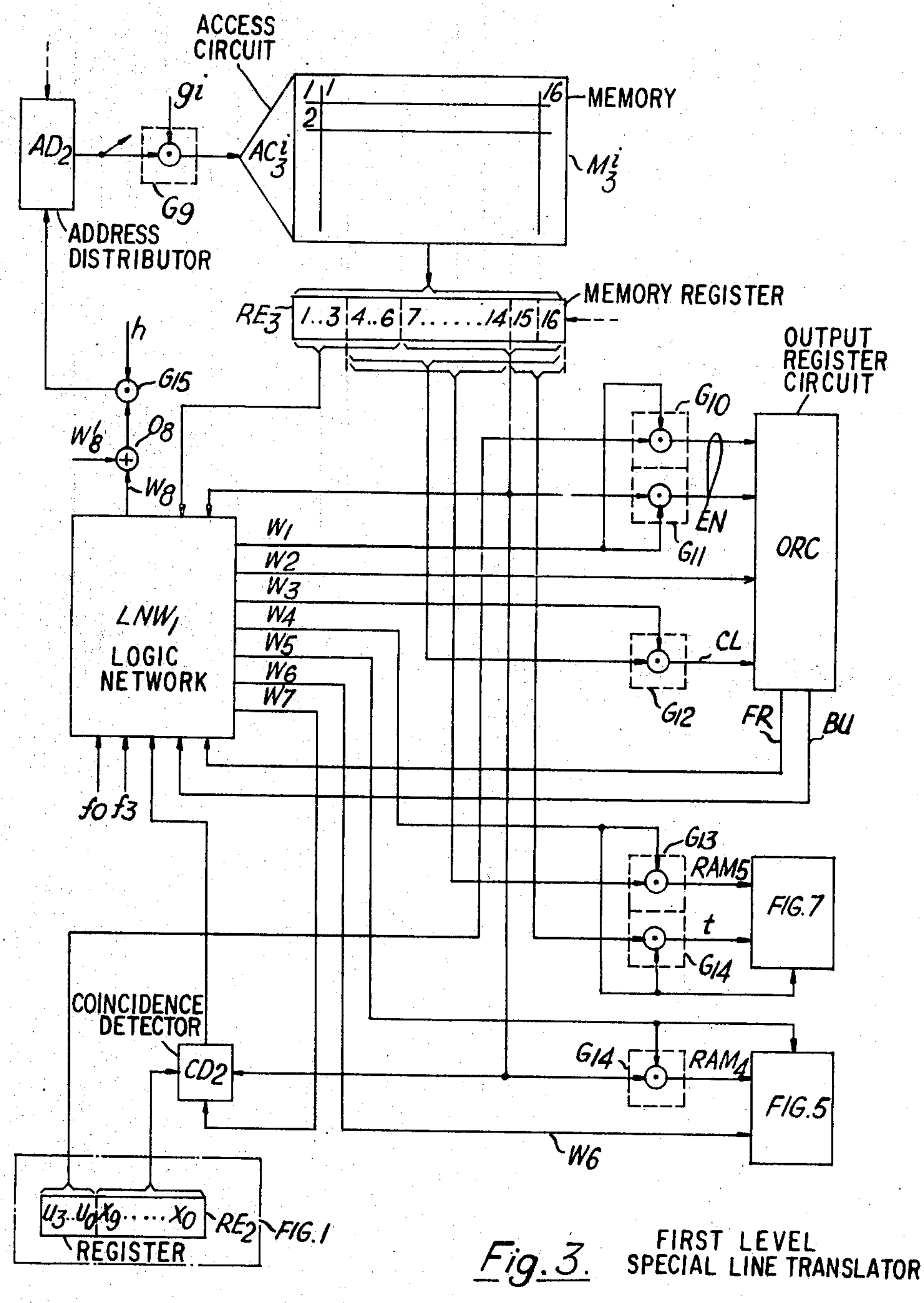
Fig. 3. FIRST LEVEL SPECIAL LINE TRANSLATOR

Fig. 4. INFORMATION STORED IN MEMORY M3, FIG. 3
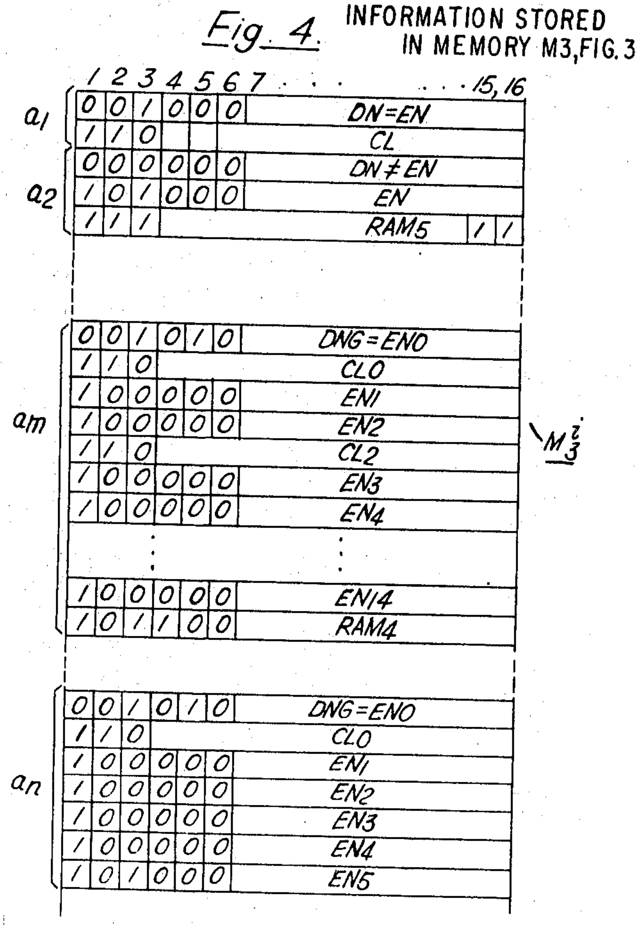
Fig. 6. INFORMATION STORED IN MEMORY M4, FIG. 5
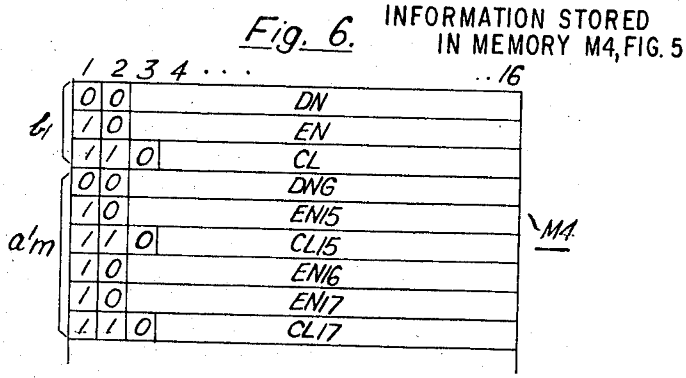

Fig. 5. SECOND LEVEL SPECIAL LINE TRANSLATOR
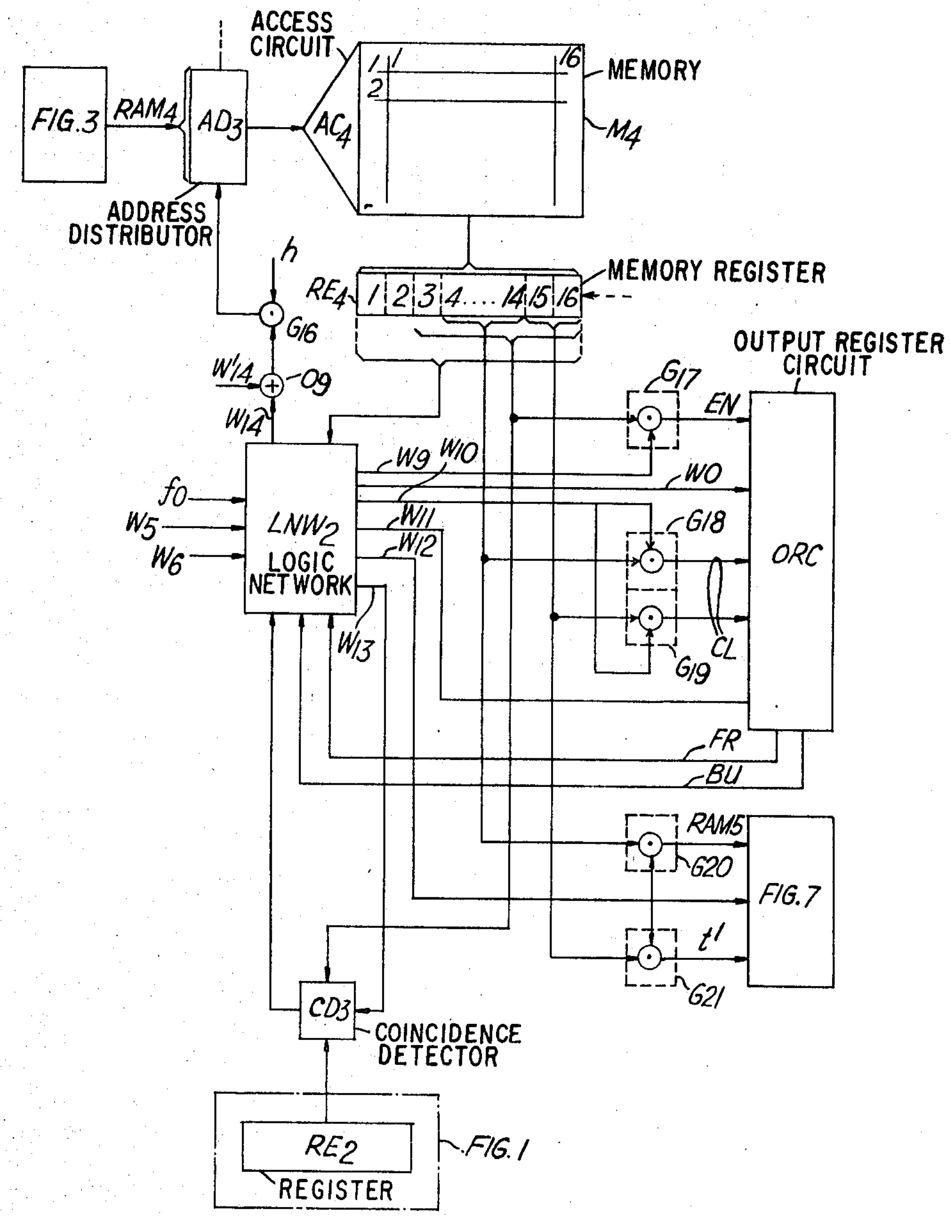

Fig. 7 AUXILIARY TRANSLATOR
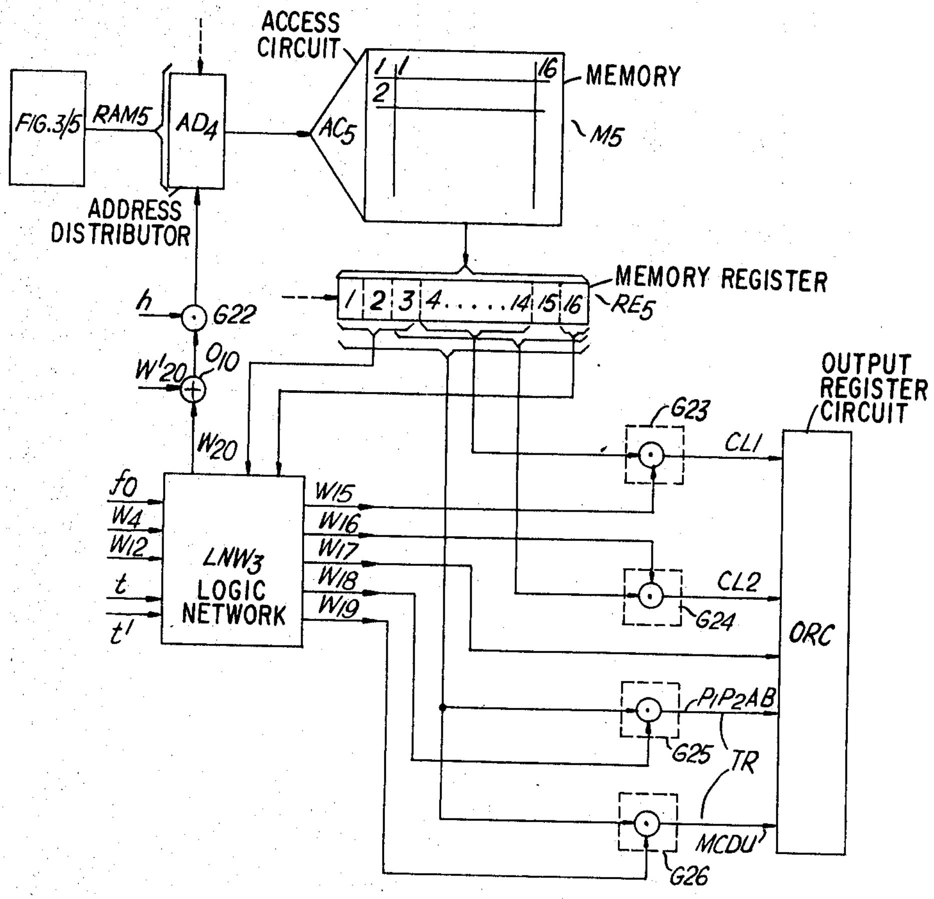

Fig. 8. INFORMATION STORED IN MEMORY M5, FIG. 7
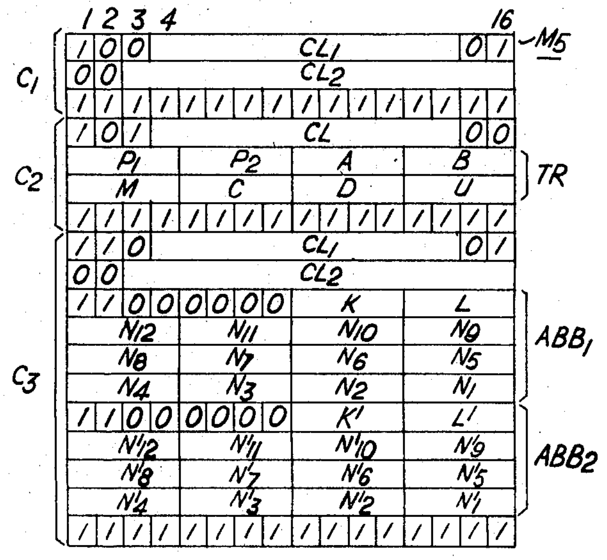

Fig. 9 EQUIPMENT NUMBER TO DIRECTORY NUMBER TRANSCODER
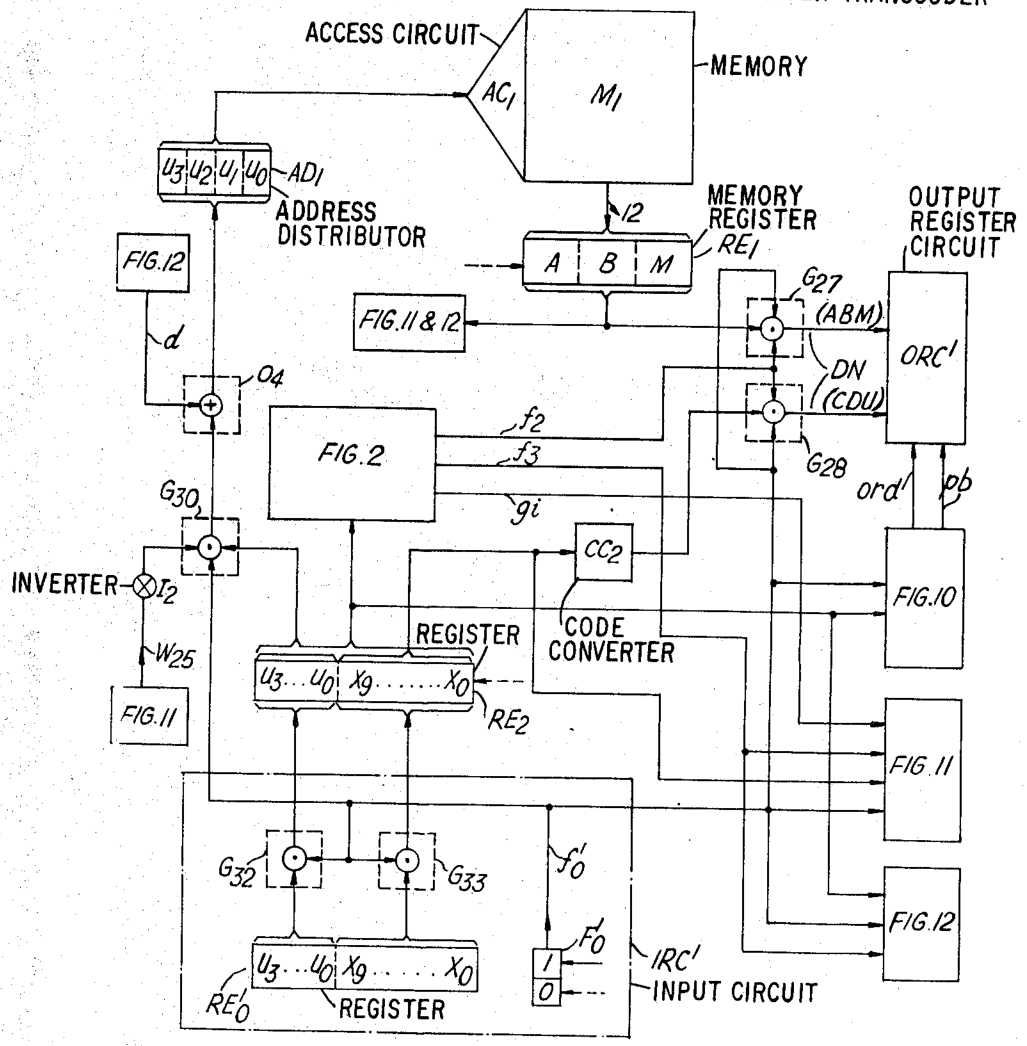

Fig. 10. DIALLING DETECTOR
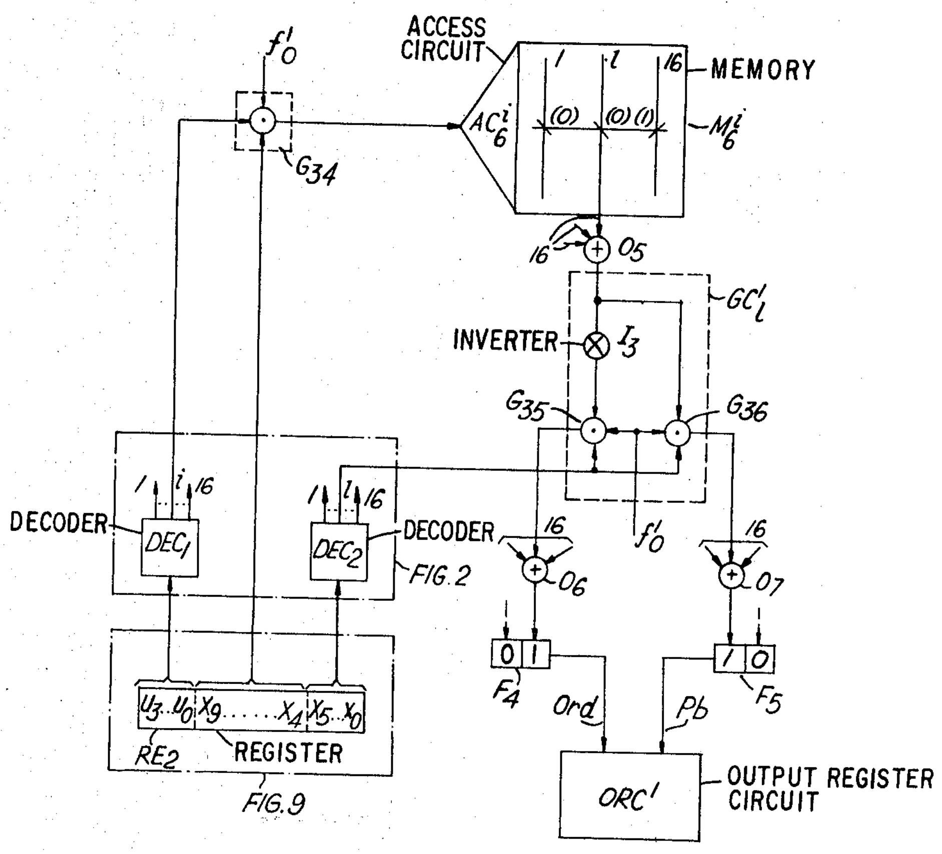

FIRST LEVEL SPECIAL LINE TRANSLATOR

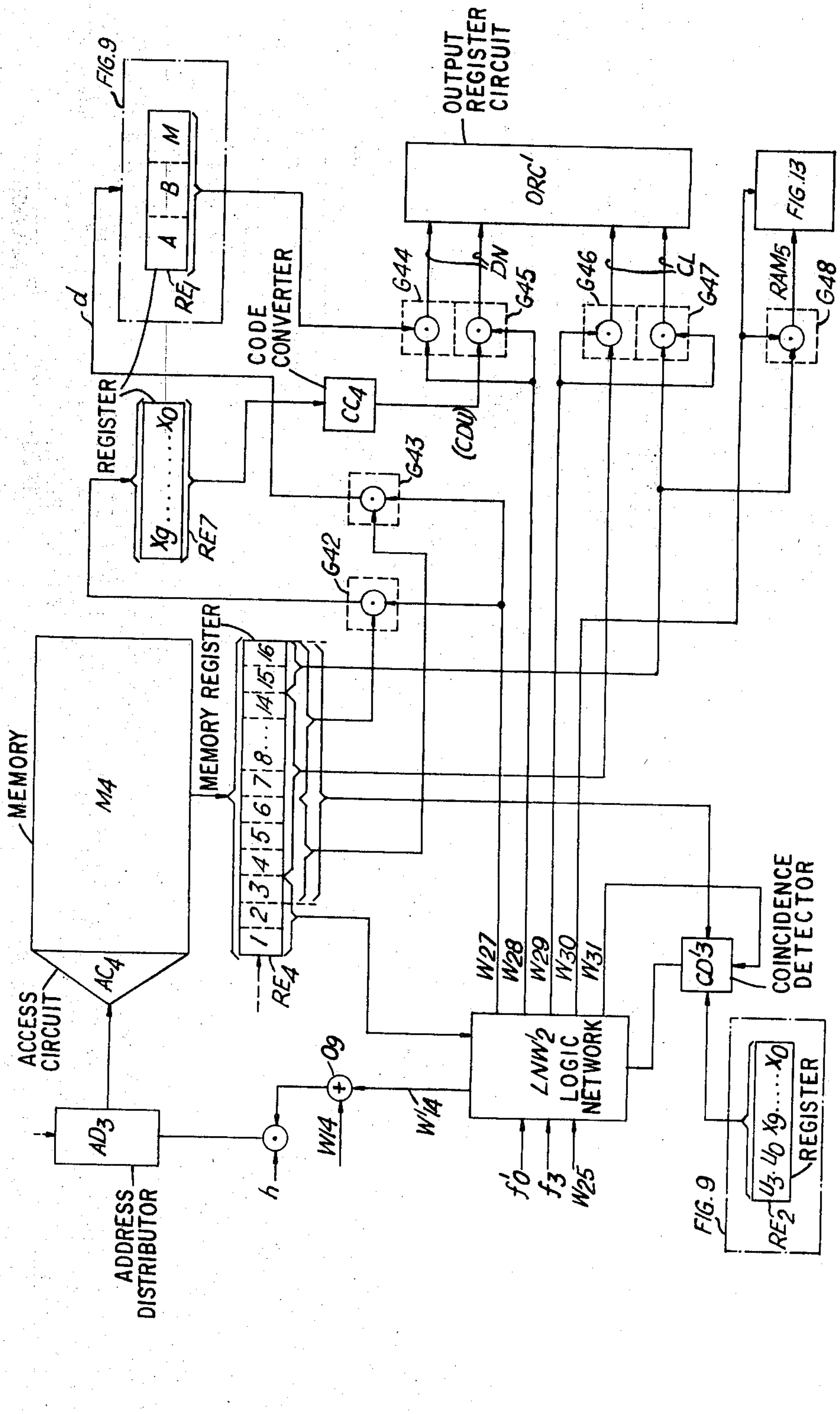
Fig. 12. SECOND LEVEL SPECIAL LINE TRANSLATOR

Fig. 13. AUXILIARY TRANSLATOR
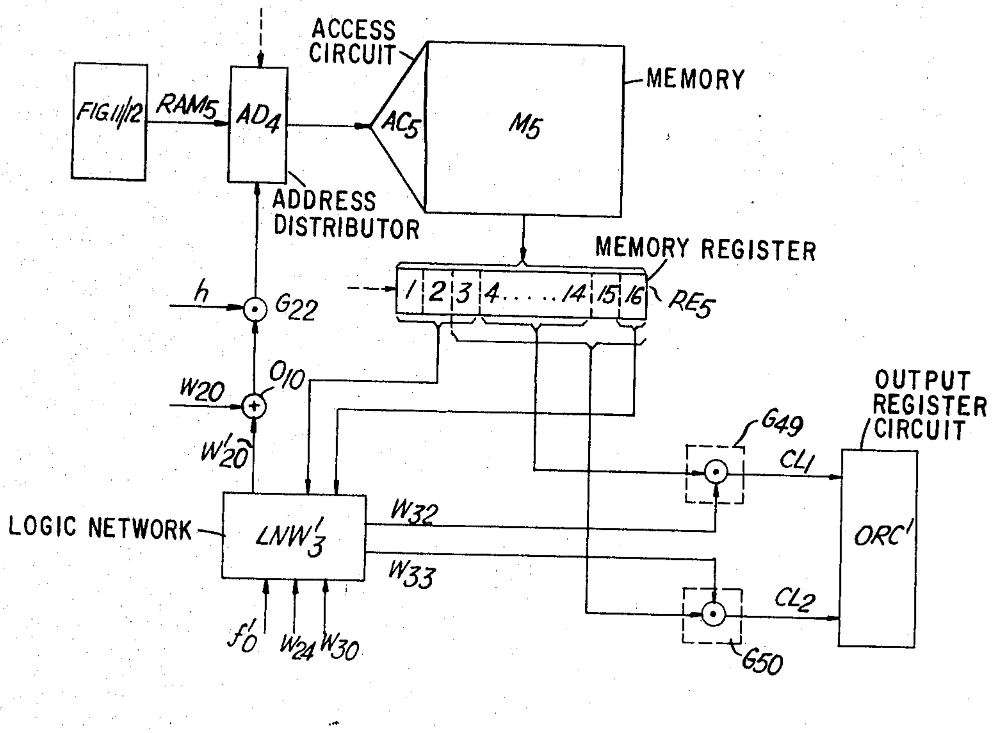

DIRECTORY NUMBER-EQUIPMENT NUMBER AND EQUIPMENT NUMBER-DIRECTORY NUMBER TRANSLATOR ARRANGEMENT

The present invention relates to a translator arrangement for an automatic switching system incorporating *n* groups of substation lines, e.g. *n* groups of thousands lines, said lines comprising normal lines which have a normal class-of-service and whose directory and equipment numbers are associated by a predetermined systematic relationship and special lines whose directory and equipment numbers are not so associated and/or which have a special class-of-service, said arrangement including detection means addressable by said directory or equipment numbers to provide in response thereto a signal indicating that the considered line is normal or special and special line translation means to translate said special lines after said detection means having issued a signal indicating a special line.

Such a translator arrangement is known from the Australian Pat. No. 281,638. The special line translation means of this known arrangement comprise *n* translation substages respectively assigned to the special lines of the *n* groups of lines, the group designation of these special lines being determined solely by the group-numbering parts of the directory numbers thereof. In this way, such a translation substage includes equipment numbers whose group-numbering parts are omitted since they correspond to the group designation of the considered substage, as well as complete equipment numbers whose group-numbering parts cannot be deduced from the group designation of the above substage. Taking into consideration that the last mentioned special lines are much less numerous than the former ones in each translation substage, it is evident that most of the special line translations are required for the former special lines. Hence, the average seizure time of this known translator arrangement to carry out a special line translation is rather long, since both kinds of special lines thereof have to be scanned without distinction. Consequently the efficiency of this arrangement is low.

Another main drawback of the above known arrangement is that each of the *n* translation substages has to be equipped individually so that common use of costly equipments, such as registers etc., is excluded. Indeed, for the equipment-to-directory number translation of a special line, the *n* substages have to be engaged in parallel to carry out the required translation, since the group-numbering part of the considered equipment number does not indicate which out of the *n* substages contains the required directory number.

Therefore, an object of the present invention is to provide an improved translator arrangement of the above type, which does not present the mentioned drawbacks.

The present translator arrangement is characterized by the fact, that said special lines are divided into first and second level special lines, said first level special lines comprising the special lines for which the respective line group numbering parts of their directory and equipment numbers are associated by a predetermined one-to-one relationship and said second level special lines comprising the remaining special lines for which the line group numbering parts of their respective directory and equipment numbers are not so associated, said group numbering parts defining respective line groups out of said *n* ones, and that said special line translation means comprise at least two translation stages, the first one of said two stages comprising at most *n* substages respectively assigned to said first level special lines of said *n* groups and the second one of said two stages being assigned in common to said second level special lines of said *n* groups.

The above mentioned and other objects and features of the invention will become more apparent and the invention itself will be best understood by referring to the following description of embodiments taken in conjunction with the accompanying drawings which show parts of a translator arrangement according to the invention and wherein, more particularly:

FIG. 2 shows a special line detector assigned to a corresponding group of lines out of the 16 ones to determine whether a line out of this group is normal or special;

FIG. 3 shows a first level translator assigned to the first level special lines of the above considered group to translate their directory numbers;

Figure 1:
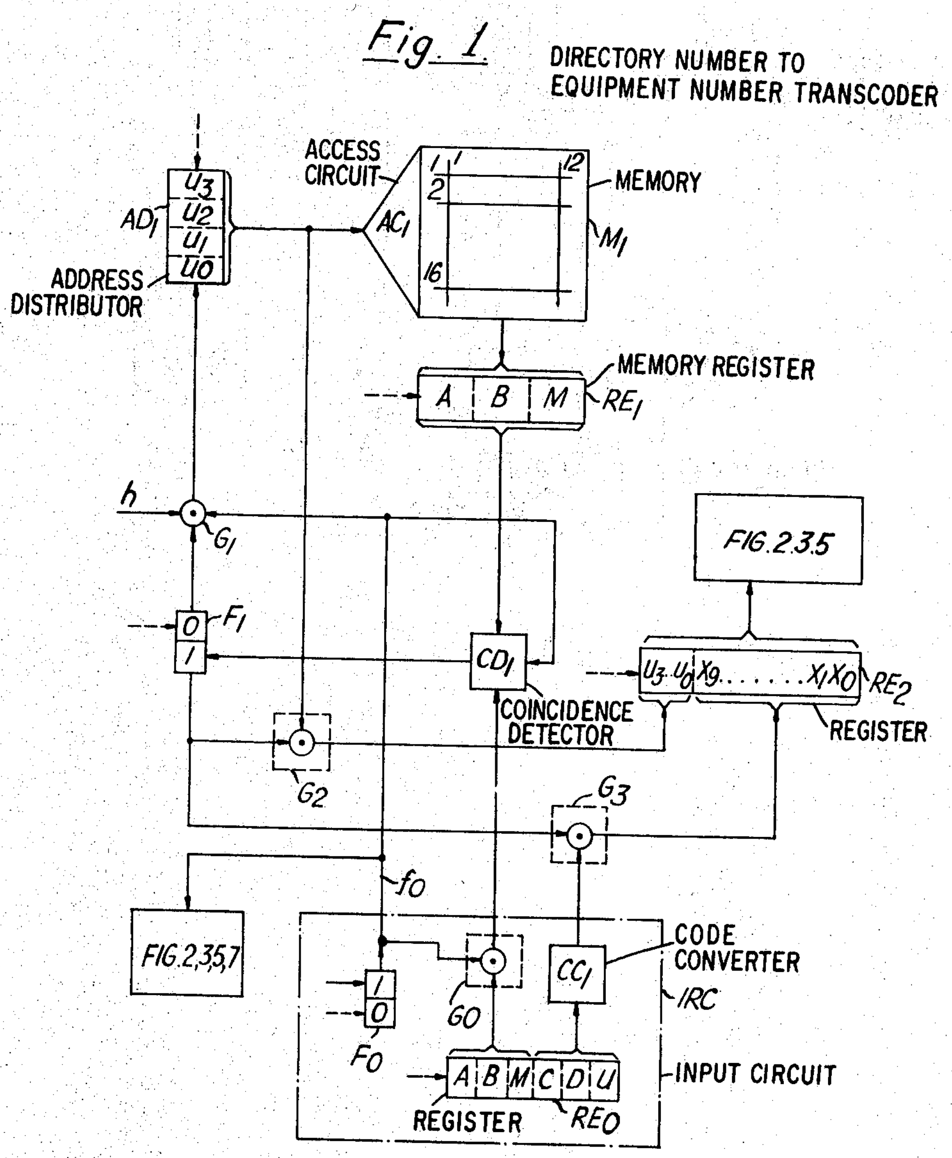
FIG. 1 shows a transcoder for an exchange incorporating 16 groups of thousand lines to transcode the directory numbers thereof to equivalent equipment numbers.
Figure 11:
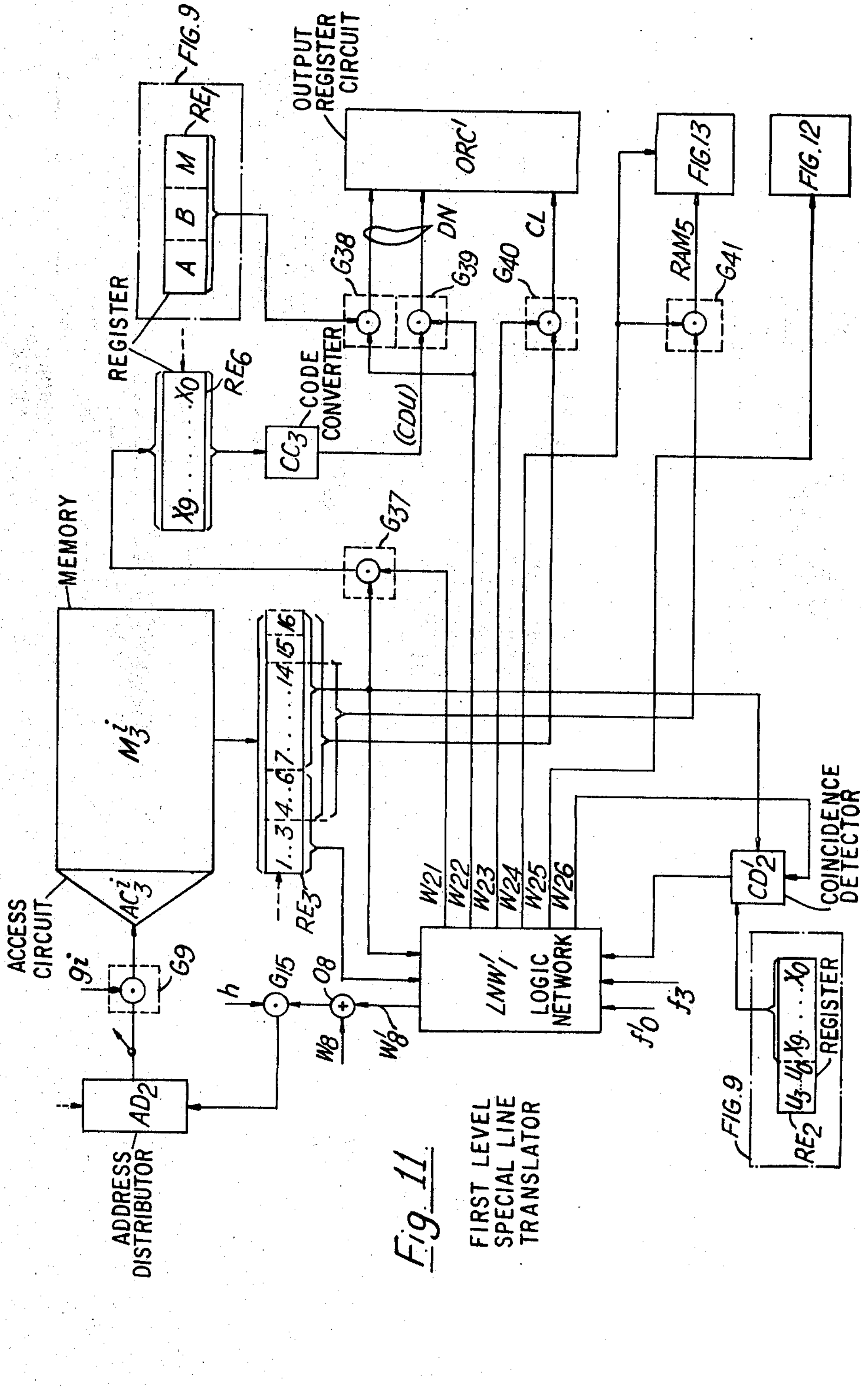

FIG. 4 diagrammatically represents how the first level special line features are stored in the translator memory of Fig. 3;

FIG. 5 shows a second level translator assigned in common to the second level special lines of all 16 line groups to translate their directory numbers;

FIG. 6 diagrammatically represents how the second level special line features are stored in the translator memory of FIG. 5;

FIG. 7 shows an auxiliary translator adapted to cooperate with the first and second level translators of FIGS. 3 and 5 for some special line translations;

FIG. 8 diagrammatically represents how some special line features are stored in the memory of the auxiliary translator of FIG. 7;

FIG. 9 shows another transcoder having common basic elements with the transcoder of FIG. 1 and enabling the transcoding of the equipment numbers of the lines of the 16 groups to equivalent directory numbers;

FIG. 10 shows a dialing detector assigned to the aforementioned group of thousand lines to determine whether a line out of this group has a pushbutton or a conventional dialing;

FIG. 11 shows another first level translator having common basic elements with the translator of FIG. 3 and enabling to translate the equipment numbers of the first level special lines of the considered group of thousand lines;

FIG. 12 shows another second level translator having common basic elements with the translation stage of FIG. 5 and enabling to translate the equipment number of all the second level special lines of the exchange; and FIG. 13 shows another auxiliary translator having common basic elements with the auxiliary translator of FIG. 7 and adapted to cooperate with the first and second level translators of FIGS. 11 and 12 for some special line translations.

SYMBOLISM

The ferrite core matrix memories, such as *M*1 (FIG. 1), are represented by rectangles identified by the letter *M* with respective indexes; the enclosed vertical and horizontal lines respectively represent column and row circuits thereof.

The square loop ferrite cores in some memories, such as memory $M_2$ (FIG. 2), are represented by short oblique strokes, a stroke (/) representing a core set in its 1-state of saturation and a stroke (\) a core set in its 0-state of saturation.

The access arrangements, such as *AC*1 (FIG. 1), associated with the above memories, are represented by triangles; the inputs correspond to the apex marked with an arrow and the various outputs are arranged on the opposite side.

Single AND-gates, such as *G*1 (FIG. 1), are represented by small size circles enclosing a dot; a dotted line square enclosing an AND-gate, such as *G*2 (FIG. 1), represents a set of AND-gates similar to the one shown.

OR-gates, such as *O*2 (FIG. 2), are represented by small size circles enclosing a cross; a dotted line square enclosing an OR-gate, such as *O*4 (FIG. 9) represents a set of OR-gates similar to the one shown.

Inverters, such as *I*1 (FIG. 2), are represented by small size circles enclosing two perpendicular diameters at 45° from the vertical and horizontal directions.

Flip-flops, such as $F_o$ (FIG. 1), are represented by two juxtaposed rectangles containing the digits 1 and 0; the 1- and 0-inputs (outputs) of flip-flops are represented by arrows pointing towards the inside (outside) of the respective 1- and 0-rectangles. Normally, the flip-flops are in their 0-condition in which their 0-outputs (1-outputs) are activated (deactivated).

Coincidence detectors or comparators, such as CD1 (FIG. 1), are represented by squares identified by the reference CD with respective indexes; the input which is opposite to the output constitutes the enabling input of a coincidence detector.

Code converters, such as CC1 (FIG. 1), are represented by squares identified by the reference CC with respective indexes.

Decoders, such as DEC1 (FIG. 2), are represented by squares identified by the reference DEC with respective indexes.

Logic networks, such as LNW1 (FIG. 3), are represented by rectangles; the arrows pointing to the inside and outside of a rectangle represent inputs and outputs of these logic networks, respectively.

Address distributors or scanners, such as AD1 (FIG. 1) are represented by rectangles identified by the reference AD with respective indexes; such a scanner is constituted by a binary counter incorporating an appropriate number of binary stages.

The dotted line arrows pointing towards the inside of bistable devices or arrangements constitute reset connections thereof.

DESCRIPTION

The two-way translator arrangement will be described, first, in connection with translations in the forward direction, i.e. directory number translations, by referring to FIGS. 1 to 8 and, secondly, in connection with translations in the reverse direction, i.e. equipment number translations, by referring to FIGS. 9 to 13. The present embodiment of the translator arrangement is adapted for being used in an automatic telephone exchange incorporating 16 line equipment frames, each one having a capacity of 1024 (=$2^{10}$) line connections. In this way the subscriber lines of the exchange are divided in 16 groups of 1024 lines. At most one thousand directory numbers are, however, associated with a same equipment frame. The difference of 24 lines per frame does not give rise to any difficulty, e.g. obligation to let unused line connections, owing to the presence of PBX-line groups, each comprising many lines grouped under a same directory number, i.e. the general directory number of the PBX-line group. In order to simplify the description these differences will, therefore, be disregarded and it will be considered that each of the 16-line groups comprises thousand lines.

The directory numbers of the above lines are constituted by 6-digit decimal numbers generally referred to as ABMCDU. These directory numbers ABMCDU are coded in the decimal-binary form, i.e. each of the decimal digits A to U is given by its 4-bit equivalent binary code number. Parts ABM of the directory number ABMCDU of a line constitutes the line group numbering part thereof normally indicating the group of thousand lines to which the considered line pertains, whereas part CDU normally gives the line identity or rank in the relevant group of lines.

The equipment numbers are constituted by 14-bit binary code numbers, generally referred to as U3U2U1U0X9 X8...X0. Part U3 ... U0 of the equipment number of a line constitutes the group-numbering part thereof, or more precisely the part defining the particular equipment frame to which the considered line is connected, whereas part X9X8 ...X0 identifies the above line in its group by defining the particular line equipment connected to this line in the relevant equipment frame, i.e. the frame defined by part U3... U0.

A line whose directory and equipment numbers have equivalent group numbering parts ABM and U3U2U1U0, i.e. which may be obtained from one another through a predetermined transcoding relationship, but whose remaining parts CDU and X9 ...X0 are not equivalent, is considered as being displaced within its group of thousand lines. This means that the above line, which should normally be connected to the particular line equipment defined by directory number part CDU in the relevant equipment frame, is displaced within the same frame to another particular line equipment defined by part X9 ... X0 of its equipment number.

A line whose directory and equipment numbers have nonequivalent numbering parts ABM and U3 ... U0, is considered as being displaced out of its normal group of lines. This means that the above line, which should normally be connected to the equipment frame defined by directory number part ABM, is displaced therefrom to another equipment frame defined by part U3 ... U0 of its equipment number.

From the above it becomes evident, that a line whose directory and equipment numbers are completely equivalent, is a nondisplaced line. It is also evident that in a PBX-line group at most one line may be nondisplaced (with respect to the general directory number of the PBX-group).

The exchange lines are divided in normal and special lines. A line is called normal when it is simultaneously equipped and nondisplaced and of normal class for the calling and called conditions. A line is called special when at least one of the following conditions is fulfilled: unequipped, displaced, of special class for either the calling or called condition. The special lines are further divided in first and second level special lines. The first level special lines comprise the lines which are displaced in their groups, as well as the nondisplaced lines of special class. The second level special lines comprise the lines displaced out of their respective normal groups. Accordingly, the special line translator comprises two major functional parts: a first level special line translation stage comprising 16 substages respectively assigned to the first level special lines of the 16 groups of thousand lines and a second level special translation stage assigned in common to the second level special lines of the above 16 groups.

The general operation scheme of the present translator arrangement is as follows:

The general operation scheme of the present translator arrangement is as follows:

The line requiring translation is first treated as a normal one, i.e. its directory (equipment) number is transcoded to its equivalent equipment (directory) number. The equivalent equipment number, or the original one in the case of a reverse translation (equipment-to-directory number), is next used to address a normal/special line detector.

If the considered line is found to be a special one, it is assumed that it is a first level special line and, accordingly, the first level translator substage assigned to the relevant group of thousand lines is engaged to carry out the required translation. If the above first level translation substage fails to carry out this translation, thus indicating that the line is not a first level special line, the second level translation stage is engaged to carry it out.

For the unequipped lines, obviously there are no translated numbers to be provided by the translator, but only an indication of this special condition. In the present translator arrangement, this indication is obtained indirectly when both first and second translation stages fail to carry out the required translation. It is to be noted that such an unequipped line translation may occur for a called line, e.g. due to an erroneous dialling of a directory number.

Referring to FIG. 1, a directory number ABMCDU requiring translation is received and inscribed in register $RE_0$ of input circuit IRC and next, flip-flop $F_0$ assigned to the translation of directory numbers is triggered to its 1-condition. The activated 1-output $f_0$ of flip-flop $F_0$ enables AND-gates G0 and G1 via which part ABM of directory number ABMCDU and the clock pulses taken from the output $h$ of a clock (not shown) are applied to the corresponding inputs of a coincidence detector CD1 and to the advance input of a scanner AD1, respectively. Scanner AD1 is constituted by a 4-stage binary counter having 16 distinct count positions from 0000 to 1111, each count position U3U2U1U0 corresponding to the group number of a particular equipment frame out of the 16 ones previously mentioned. The access circuit AC1 decodes each of the above 4-bit codes U3...U0 sequentially provided by scanner AD1 and in response thereto it applies an interrogation signal to the corresponding memory row, i.e. the row containing the code number ABM which is equivalent to the code number U3U2U1U0 provided by scanner AD1. The result obtained from each interrogation of memory M1 replaces the preceding result in the memory register RE1. Upon a result ABM of the interrogation of a memory row being identical to part ABM of the received directory number ABMCDU in register REO, coincidence detector CD1, enabled by the 1-output $f_o$ of flip-flop $F_o$, reacts and through its activated output it triggers flip-flop F1 to the 1-condition. The deactivated O-output of flip-flop F1 inhibits the passage of the clock pulses through AND-gate G1, so that the scanning of memory M1 is stopped. The activated 1-output of flip-flop F1 enables AND-gates G2 and G3. Through the latter gates the content U3 ... U0 of scanner AD1 and part CBU of the directory number ABMCDU stored in register REO are communicated to register RE2, the part CDU being previously code converted in straight binary form X9 ... X0 by code converter CC1. In this way, the directory number ABMCDU of register REO has been transcoded to its equivalent equipment number U3 ... U0 X9 ... X0 stored in register RE2. This equivalent equipment number U3..U0X9..X0 is next used to address the normal/special line memory part $M_2$ (FIG. 2). Memory $M_2$ comprises 16 parts or modules $M_2^1$ to $M_2^{16}$, which are respectively assigned to the 16 groups of thousand lines. Each memory module $M_2^i$ ($i = 1$ to 16) comprises 16 columns ($l = 1$ to 16) and 64 rows ($j = 1$ to 64), each crosspoint being assigned to a corresponding line out of the $i^{th}$ group of lines associated thereto. Decoder DEC1 decodes part U3 ... U0 of the equivalent equipment number U3 ... U0 X9...X0 stored in register RE2 and via its activated output $i$ it selects the corresponding memory module $M_2^i$ by enabling AND-gates G4 associated thereto. Part X9...X4 of the above equivalent equipment number, which is applied to access circuit $AC_2^i$ via AND-gates G4, enables the addressing of the relevant memory row $j$ ($j = 1$ to 64). The selection of the corresponding crosspoint of the above row $j$ and column $l$ is performed by decoder DEC2 which decodes part X3...X0 of the equivalent equipment number U3...U0 X9...X0 and enables the AND-gates G5 and G6 of the relevant column gating circuit GCl via its activated output $l$. OR-gate O1 has 16 inputs respectively connected to the outputs of the 16 homologous column circuits $l$ of the 16 memory modules $M_2^1$ to $M_2^{16}$. OR-gates O2 and O3 each also have 16 inputs which are connected to the outputs of the AND-gates G5 and G6 of the 16 gating circuits GC1 to GC16, respectively.

If the selected crosspoint core of memory module $M_2^i$ is in its O-state, the associated line is normal. The readout of the considered core then causes flip-flop F2 to be triggered to its 1-condition. The activated output $f2$ of flip-flop F2 enables AND-gates G7, via which the equivalent equipment number U3 ...U0 X9...X0 constituting the required equipment number, is communicated to the output register circuit ORC. The translation is finished and via its output $rst$ output register circuit ORC resets the translator to its rest condition.

If the selected crosspoint core of memory module $M_2^i$ is in its 1-state, this means that its associated line is special and then, the readout of the considered core causes flip-flop F3 to be triggered to its 1-condition. As it has previously been pointed out, this special line is first considered as being of the first special level and accordingly the relevant substage of the first level translation stage (FIG. 3) is engaged to carry out the required translation. This first level translation stage comprises a memory M3 and logical circuits associated thereto. Memory M3 comprises 16 parts or modules $M_3^1$ to $M_3^{16}$ which constitute the 16 first level translation substages assigned to the special lines of the 16 groups of thousand lines respectively. Each memory module $M_3^i$ ($i = 1$ to 16) comprises 16 columns and an appropriate number of rows.

FIG. 4 diagrammatically shows how information is stored in memory module $M_3^i$. Each first level special line or PBX line group out of the considered $i^{th}$ group of thousand lines is associated with a respective memory cell out of the $n$ ones $a1$ to $an$ of the memory module $M_3^i$. The number of words per cell is variable and depends on the features of the line or group of lines (PBX) associated thereto. Each word contains a certain information, such as directory number (DN), equipment number (EN), class-of-service (CL) or a relative address (RAM) to another memory, and a code specifying the type of information. The first word of a cell always contains the directory number DN of the relevant line and the indication PBX group or not. In the case of a PBX group the above first word contains the general directory number $DN_G$ of the group.

For a non-PBX line the words following the directory number DN contain successively, the equipment number EN if the line is displaced, i.e. if its directory number DN is different from its equipment number EN, and the class-of-service CL if the line is of special class.

For a PBX group the words following the general directory number $DN_G$ of the group contain successively:

the equipment number ENO of the first line if it is different from the general directory number $DN_G$;

a class word $CL_O$ relative to the first line if necessary for another line of the group;

the equipment number;

the respective class word if necessary.

The above directory and equipment numbers are 10-bit binary numbers occupying bits 7 to 16 of the corresponding memory rows. These 10-bit binary numbers define their associated lines within the relevant groups of thousand lines. In other words, a directory number DN is given by its part CDU coded in straight binary form, i.e. part X9...X0 of its equivalent equipment number, and a genuine equipment number EN is given by its part X9...X0. The group numbering parts ABM or U3...U0 of the above directory or equipment numbers are omitted as being in agreement with the group designation of their associated memory modules $M_3^1$ to $M_3^{16}$.

A class word CL comprises 13 bits, i.e. bits 4 to 16 of the respective memory rows, and a 3-bit code (code 110) specifying this type of information.

For lines with complex class and/or other special features, e.g. transfer of call facility, necessitating more than one row to store the relative information, the row following their equipment number, instead of a class word, comprises the relative address RAM5 (bits 4 to 14) of the first word of the cell of an auxiliary translator memory M5 (FIG. 7) wherein are stored the corresponding special features of the considered line. Bits 1 to 3 of the above row of memory module $M_3^i$ store a 3-bit code (code 111) specifying this type of information, whereas bits 15 and 16 thereof are temporary class bits indicating for instance, whether there is an effective transfer of call facility etc.

For a PBX group comprising lines displaced within their groups, as well as lines displaced outside their groups of thousand lines, the last word of the relevant cell in memory module $M_3^i$ comprises the relative address RAM4 of the first equipment number of the cell of the second special level translator memory M4 storing the second level special lines of the considered PBX group.

Cell $a1$ of memory module $M_3^i$ (FIG. 4) is assigned to a non-displaced line (DN = EN) of special class CL. Cell $a2$ is assigned to a displaced line (within its group of thousand lines) which has an effective transfer of call facility, i.e. the calls terminating to this line must be transferred to another line whose area code and directory number, as it will later be described, are stored in a corresponding cell of auxiliary translator memory M5. Cell $am$ is assigned to a PBX group comprising lines in both first and second special levels. The last word of cell $am$ comprises a relative address RAM4 for linkage with the corresponding cell (cell $a'm$, FIG. 6) of second level translator memory M4. Cell $an$ is assigned to a PBX group comprising only lines in the first special level.

FIG. 6 diagrammatically shows how information is stored in the above mentioned second level translator memory M4. The organization of this memory, common to the second level special lines of all groups of thousand lines, is similar to the organization of memory module $M_3^i$ except that the directory and equipment numbers DN and EN are stored in their complete form. The directory numbers DN are inscribed in straight binary form by means of the bits 3 to 16 of their respective rows, i.e. they are given by their equivalent equipment numbers U3...U0 X9...X0. Bits 1 and 2 of a row storing a directory or equipment number are code bits specifying the type of information stored in the considered row, i.e. code 00 (10) indicated a directory (equipment) number. Cell *b*1 of memory M4 is assigned to a non-PBX second level special line of special class. Cell *a'm* is assigned to the second level special lines of the PBX group whose first level special lines are associated with cell *am* of memory module $M_3^i$. It is to be noted that in cell *a'm* the general directory number $DN_G$ of the PBX group is repeated in its complete form at the first row of the cell.

FIG. 8 diagrammatically shows how information is stored in the above mentioned auxiliary translator memory M5. The cells of this memory M5 comprise 16-bit rows whose number is variable in accordance with the special features of their associated lines. Bits 1 to 3 of the first row of each cell store a code specifying the type of information contained in the cell, bits 4 to 14 of this first row are class information bits, whereas bit 16 thereof indicates whether there is a second class word following the first one. The values of the binary code bits 1 to 3 and 16 of the above first row (class word) of a cell of memory M5 are as follows:

bit 1: always 1;

bit 2: 1 if abbreviated dialing is allowed 0 if not;

bit 3: 1 if transfer of call is allowed 0 if not;

bit 16: 1 if a second class word is following 0 if not.

In the present example of description, it is assumed that the abbreviated number are 2-digit decimal numbers referred to as KL. Numbers KL are coded in decimal binary form and are stored by means of bits 9 to 16 of their associated memory rows. Bits 1 to 8 of the latter rows contain a code (11000000) specifying this type of stored information. The complete numbers comprising 12 decimal digits N12...N1 are also coded in decimal binary form and follow their respective abbreviated numbers KL.

In the part of memory M5 shown in FIG. 8, cell *c*1 contains two class words CL1 and CL2, no transfer of call and abbreviated dialing facilities being allowed for its associated line. Cell *c*2 is assigned to a line having a transfer of call facility. This cell *c*2 contains one class word CL and the number TR specifying the line to which the terminating calls must be transferred, if the relative indication (bits 15 and 16 at "1") of the address word RAM5 of the corresponding cell of the memory M3 or M4 specifies that the transfer of call is effective. Number TR comprises 8 decimal digits P1P2 ABMCDU coded in decimal binary form, with part P1P2 constituting the code of the area to which the following directory number ABMCDU belongs, Cell *c*3 is assigned to a line of complex class having abbreviated dialing facilities. It comprises two class words CL1 and CL2 and two abbreviated dialings ABB1 and ABB2 which comprise the abbreviated numbers KL and K'L' followed by their associated complete numbers N12...N1 and N'12...N'1, respectively.

Returning now to FIG. 2 and considering the case in which flip-flop F3 is triggered to its 1-condition due to the line whose equivalent equipment number inscribed in register RE2 being a special one, the activated 1-output *f*3 of flip-flop F3 enables, on the one hand, the 2-input AND-gate $G_8^i$ whose second input is connected to the output *i* of decoder DEC1, and, on the other hand, logic network LNW1 (FIG. 3) associated with the previously mentioned first level translator memory M3. The activated output *gi* of AND-gate $G_8^i$ enables AND-gates G9 associated with memory module $M_3^i$ which is assigned to the first level special lines of the $i^{th}$ group of thousand lines. The activated output *w*8 of logic network LNW1 enables AND-gate G15 through which clock pulses are applied to the advance input of scanner AD2 common to the modules $M_3^1$ to $M_3^{16}$ of memory M3. These clock pulses are taken from the output *h* of the aforementioned clock. Scanner AD2 starts scanning memory module $M_3^i$, the interrogation results of the successive memory rows being registered in register RE3 by overwriting one another. Logic network LNW1 to which, the successive interrogation results are communicated, detects the codes indicating the type of information comprised in each word appearing in register RE3. Output *w*7 of logic network LNW1, which is activated each time a directory number word DN appears in register RE3, enables coincidence detector circuit CD2 during that time. The latter circuit compares parts X9...X0 of the directory numbers registered in binary form in registers RE2 and RE3. Upon a directory number part X9...X0 in register RE3 (bistables 7 to 16) being identical to the homologous part X9...X0 in register RE2, coincidence detector CD2 reacts and through its activated output acknowledges this coincidence to logic network LNW1.

If the code in bistables 1 to 6 of register RE3 specifies that the registered directory number DN pertains to a non-PBX line and is the same as the line equipment number EN, such as for the line associated with cell *a*1 (FIG. 4), output *w*1 of logic network LNW1 is activated. Output *w*1 enables AND-gates G10 and G11 through which group-numbering part U3...U0 and part X9...X0 of the required equipment number, respectively taken from register RE2 and register RE3, are transmitted to the output register circuit ORC. The interrogation of the next row of the above considered cell *a*1, causes the class word CL of the corresponding line to appear in memory register RE3. At that moment, output *w*3 of logic network LNW1 is activated, whereas outputs *w*1 and *w*8 thereof are deactivated. The deactivated output *w*8 of logic network LNW1 disables the passage of clock pulses through the AND-gate G15, so that the scanning of memory $M_3^i$ is stopped. The above class word CL is transmitted to the output register circuit ORC via the AND-gates G12 enabled by output *w*3 of logic network LNW1.

If the code in bistables 1 to 6 of register RE3 specifies that the registered directory number pertains to a non-PBX first level special line which is displaced, such as the line associated with cell *a*2 (FIG. 4), then output *w*1 of logic network LNW1 is activated only when the corresponding equipment number EN appears in memory register RE3. The reading of the next row of memory cell *a*2 causes the relative address word RAM5 to memory M5 to appear in register RE3. At that time, output *w*4 of logic network LNW1 is activated and enables AND-gates G13 and G14 via which the address RAM5 of memory M5 and the temporary class indication *t* (bits 15 and 16) are communicated to the auxiliary translator of FIG. 7, respectively. As will be described later, when the above temporary class bits 15 and 16 indicate that the transfer of call facility is effective, the equipment number EN obtained from the translated directory number DN is canceled in the output register circuit ORC. In the latter case number P1P2ABMCDU identifying the line to which the call must be transferred is communicated by the auxiliary translator of FIG. 7 to the output register circuit ORC for further processing.

If the above considered directory number in register RE3 is the general directory number $DN_G$ of a PBX group, output *w*2 of logic network LNW1 is activated and acknowledges this fact to output register circuit ORC. The following equipment number $EN_0$ and the eventual class word are sent to output circuit ORC via AND-gates G10 and G11 in the same way as above. Output *w*8 of logic network is deactivated and the scanning of memory module $M_3^i$ is stopped. Output register circuit ORC engages its associated free-busy test network (not shown) which checks the free-busy line conditions in order to detect whether the PBX line considered is free or busy and acknowledges the relative test result to logic network LNW1 by activating output FR or BU according to the tested line being free or busy respectively. In case the tested PBX line is free, the translation operation is finished and the translator arrangement is restored to its rest condition in the same way as described previously. In case the tested line is busy, output *w*8 of logic network is reauthorized and the next PBX equipment number EN1 appearing in register RE3 is transmitted to the output register circuit ORC. The process is continued in a similar way, until a free line is found in the considered PBX group.

If the above PBX line group has lines in both first and second special levels, such as the PBX group associated with cells *am* and *a'm* (FIGS. 4 and 6), and if its first level special lines are found busy, the last word of the PBX cell containing the relative address RAM4 of the first equipment number in the corresponding cell e.g. cell *a'm*, of the second level translator memory M4 (FIG. 5) causes the activation of output *w*5 of logic network LNW1. The activated output *w*5 of logic network LNW1 enables, on the one hand, AND-gates G14 via which the above relative address RAM4 is transmitted to scanner AD3 (FIG. 5) of the second level translator memory M4, and, on the other hand, logic network LNW2 associated with memory M4. Consequently, the scanning of the remaining lines of the considered PBX group is continued in the second level translator memory M4.

In case the scanning of memory module $M_3^i$ is not conclusive, i.e. no coincidence occurs between the directory numbers DN successively appearing in memory register RE3 and the directory number DN in register RE2, the last word (not shown) of memory module $M_3^i$ which contains all 1-bits, causes the activation of the outputs *w*6 of logic network LNW1 and the deactivation of output *w*8 thereof. The deactivated output *w*8 disables AND-gate G15, so that the scanning of memory module $M_3^i$ is stopped, whereas the activated output *w*6 enables logic network LNW2 associated with the second level translator memory M4 (FIG. 5) thereby initiating the scanning of the latter memory M4.

Referring to FIG. 5, the scanner or address distributor AD3 associated with the second level translator memory M4 may receive from the first level translator of FIG. 3 an address RAM4 relative to the first equipment number of the second level cell, e.g. cell *a'm* (FIG. 6), of a PBX group having lines in both first and second special levels. It may also be advanced step by step, starting from its 0-position, by clock pulses applied to its advanced input through AND-gate G16 when the latter is enabled by output *w*14 of logic network LNW2. The principle of operation of this second level translator is substantially similar to that of the first level translator described hereabove and will therefore only be described briefly hereinafter.

In case scanner AD3 receives from the first level translator (FIG. 3) a relative address RAM4 which corresponds to the first equipment number of a PBX cell, the reading of the corresponding memory row causes this first equipment number to appear in memory register RE4. Logic network LNW2 which has been enabled by output *w*5 of logic network LNW1, detects the code assigned to the equipment numbers stored in memory M4 (code 10 at bits 1 and 2 of the equipment number row) due to which output *w*9 of network LNW2 is activated. The activated output *w*9 enables AND-gates G17 through which the above complete equipment number EN is transmitted to output register circuit ORC. The eventual class word associated with the considered line is transmitted to output register circuit ORC via AND-gates G18 and G19 enabled by output *w*10 of logic network LNW2, upon this class word appearing in memory register RE4. The free-busy line test of the PBX lines is carried out in the same way as previously described and the relative result is acknowledged to logic network LNW2 via outputs FR and BU of output circuit ORC.

For a non-PBX line, the output *w*14 of logic network LNW2 is activated upon input *w*6 thereof being activated by the homologous output *w*6 of logic network LNW1. The activated output *w*14 of network LNW2 enables AND-gate G16, so that clock pulses are applied to the advance input of scanner AD3 and the scanning of memory M4 is consequently started. Logic network LNW2 which detects the kind of information successively appearing in memory register RE4, activates its output *w*13 each time a directory number is inscribed therein, thus enabling coincidence detector CD3 to compare each of these directory numbers to the one inscribed in register RE2. Upon such a comparison result being conclusive, logic network LNW2 is informed of this fact by the then activated output of this coincidence detector CD3. The equipment number EN and eventually the class word cl. associated with the considered line are successively transmitted to the output register circuit ORC via the AND-gates G17 and G18/19 enabled by outputs *w*9 and *w*10 of logic network LNW2, respectively. In case the above line is of complex class and/or has a transfer of call facility, the code (111 at bits 1 to 3) indicating the relative address word RAM5 to auxiliary translator memory M5, causes the activation of output *w*12 of logic network LNW2. The activated output *w*12 of logic network LNW2 enables AND-gates G20 and G21 via which the relative address word RAM5 (bits 4 to 14) and the temporary class indication (bits 15/16; output t') are respectively transmitted to scanner AD4 and logic network LNW3 associated with the auxiliary translator memory M5 (FIG. 7). The activated output *w*12 also enables logic network LNW3, so that the auxiliary translator is engaged to complete the required translation.

In case the scanning of memory M4 is not conclusive, i.e. no coincidence occurs between the directory numbers DN successively appearing in memory register RE4 and the directory number DN successively appearing in memory register RE4 and the directory number DN in register RE2, the last word (not shown) of memory M4, which contains all 1-bits, causes the activation of output *w*0 of logic network LNW2 and the deactivation of output *w*14 thereof. The thus activated output *w*0 of logic network LNW2 to acknowledges to output register circuit ORC that the received directory number pertains to an unequipped line.

The address RAM5 received from the first or second level translator (FIG. 3 or 5) in scanner AD4 of memory M5 (FIG. 7) causes the first word of the corresponding cell to appear in memory register RE5. As it has been mentioned previously, bits 1 to 3 of this first word constitute the code specifying the type of information contained in the cell, bits 4 to 14 thereof constitute class information bits (bit 15 being unassigned) and bit 16 thereof indicates whether there is a second class word or not.

If the relative temporary class indication *t* or *t'* applied to logic network LNW3, specifies that there is no active transfer of call facility for the considered line, then output *w*15 of network LNW3 is activated and enables AND-gates G23 through which the above class word (bits 4 to 14) is transmitted to the output register circuit ORC. If there is a second class word following the first one, output *w*20 of logic network LNW3 is activated and enables AND-gate G22 until one clock pulse is applied therethrough to the advance input of scanner AD4. Scanner AD4 steps to its next count position and the second class word appears in memory register RE5. Output *w*16 of logic network LNW3 is then activated and enables AND-gates G24 via which the above second class word is transmitted to the output register circuit ORC which restores the translator to the rest condition.

If the relative temporary class indication *t* or *t'* applied to logic network LNW3 specifies that there is an active transfer of call facility for the considered line, output *w*17 of logic network LNW3 is activated and acknowledges this fact to output register circuit ORC which cancels the equipment number previously received from the first or second level translator. At the same times, outputs *w*15 and *w*16 of logic network LNW3 are inhibited whereas output *w*20 thereof is enabled. AND-gates G23 and G24, hence, remain in their blocking condition, so that no class information is transmitted to the output register circuit ORC. The transfer of call number TR, occupying the two memory rows following the class information row(s), next appears in register RE5. Hereby the parts P1P2AB and MCDU thereof appear in succession and are successively transmitted to the output register circuit ORC via the AND-gates G25 and G26 which are enabled by the outputs *w*18 and *w*19 of logic network LNW3, respectively. The translation operation is thus finished and output register circuit ORC restores the translator to its rest condition.

The principle of operation of the translator arrangement in the reverse translation direction, i.e. equipment-to-directory number, will hereinafter be described by referring to FIGS. 9 to 13.

The equipment number U3...U0 X9...X0 requiring translation is received and inscribed in register $RE'_0$ of input register circuit IRC' (FIG. 9) and next, flip-flop $F'_0$ assigned to the translation of equipment numbers is triggered to its 1-condition. The activated 1-output $f'_0$ of flip-flop F' enables AND-gates G32, G33 and G30. The equipment number U3...U0 X9...X0 is communicated from register $RE'_0$ to register RE2 via the thus enabled AND-gates G32 and G33, and the line group numbering part U3...U0 is communicated from register RE2 to address distributor AD1 of memory M1. The addressing memory M1 with the above equipment number part U3...U0 causes the appearance of the corresponding directory number part ABM in register RE1.

The equipment number U3...U0 X9...X0 inscribed in register RE2 further addresses the special line detector memory M2 of FIG. 2 in the way previously described, as well as the dialing detector memory M6 of FIG. 10. This dialing detector memory M6 is organized in the same way as the special line detector memory M3. It comprises 16 memory modules $M_6^1$ to $M_6^{16}$, respectively, assigned to the 16 groups of thousand lines. Each core of a memory module $M_6^i$ ($i = 1$ to 16) is associated with a corresponding line out of the $i^{th}$ group of thousand lines to indicate whether this line is provided with an ordinary or pushbutton dialing, the 0- and 1-states of each magnetic core respectively indicating an ordinary and a pushbutton dialing for the associated line. The selection of the corresponding core memory M6 is performed in the same way as for memory M2 previously described: the line group numbering part U3...U0 of the equipment number inscribed in register RE2 selects the appropriate memory module $M_6^i$ via decoder DEC1 by enabling the AND-gates G34 associated with this module $M_6^i$; part X9...X4 of the above equipment number addresses the memory row containing the required magnetic core via the enabled AND-gates G34 and the access arrangement $AC_6^i$, whereas part X3...X0 thereof selects the above memory core by enabling gating circuit GC'l associated with the relevant column l of module $M_6^i$. According to the thus interrogated core being in its 0- or 1-state of saturation, flip-flop F4 or flip-flop F5 is triggered to its 1-condition and via its activated 1-output *ord* or *pb* acknowledges to the output circuit ORC' the kind of dialing, i.e. ordinary or pushbutton, of the considered line respectively.

If the above line is normal, the 1-output *f2* of flip-flop F2 of special line detector (FIG. 2) is activated and enables AND-gates G27 and G28. Part ABM of the required directory number ABMCDU is transmitted by memory register RE1 to the output register circuit ORC' through the enabled AND-gates G27, whereas part CDU thereof is transmitted by register RE2 to circuit ORC' through the series arrangement of the code converter CC2 and the enabled AND-gates G28. The latter converter CC2 converts the equipment number part X9...X0 of register RE2 in decimal binary form. The translation is finished and output register circuit ORC' restores the translator to the rest condition.

If the considered line is special, the 1-output *f3* of flip-flop F3 of the special line detector (FIG. 2) is activated and in combination with the output *gi* of the corresponding AND-gate $G_8^i$ it engages the corresponding first level translator memory module $M_3^i$ (FIG. 11) to carry out the required translation.

The logic network LNW'1 of the first level special line translator (FIG. 11), which is adapted to perform logical operations for the reverse translation direction, is activated by the 1-output *f3* of flip-flop F3 (FIG. 2). Following this activation, output W'8 of LNN'1 is activated so that AND-gate G15 is enabled. Through this gate clock pulses are applied to the advance input of scanner AD2 which thus starts the scanning of the selected memory module $M_3^i$ via the enabled AND-gates G9. Logic network LNW'1 to which are applied the successive interrogation results appearing in memory register RE3, activates its outputs *w*21 and *w*26 each time a directory number DN and an equipment number EN appear in register RE3 respectively. The activated output *w*21 of logic network LNW'1 enables AND-gates G37, through which the directory number part X9...X0 (binary form) is transmitted to and registered in register RE6 by overwriting the previous register content. The activated output *w*26 of logic network LNW'1 enables coincidence detector CD'2 to compare the equipment number parts X9...X0 appearing in memory register RE3 to the corresponding equipment number part X9...X0 in register RE2. Upon a comparison result being conclusive output *w*22 of logic network LNW'1 is activated. Due to this, the AND-gates G38 and G39 are enabled and through these gates the required directory number ABMCDU is transmitted to the output circuit ORC'. Part ABM of the above directory number is taken from memory register RE1 (FIG. 9), whereas the part CDU thereof is taken from the register RE6 whose content X9...X0 is converted in decimal-binary form (CDU) by code converter CC3. If the above considered line is of special class (only one class word), the relevant class information next appearing in register RE3 is transmitted to the output register circuit ORC' via AND-gates G40 enabled by the then activated output *w*23 of logic network LNW'1. If the considered line has a complex special class, the relative address RAM5 to the auxiliary translator memory M5, which next appears in register RE3 is transmitted to the auxiliary translator (FIG. 13) via the AND-gates G41 enabled by the then activated output *w*24 of logic network LNW'1.

If the scanning of the first level translator memory module $M_3^i$ is not conclusive, i.e. upon the last word thereof completely constituted by 1-bits appearing in memory register RE3, output *w*25 of logic network LNW'1 is activated. Consequently, the second level translator (FIG. 12) is engaged to carry out the required translation.

The logic network LNW'2 for the second level special line translator (FIG. 12), which is adapted to perform logical operations for the reverse translation direction, is activated by the output *w*25 of logic network LNW'1. Following this activation, output *w*'14 of LNW'1 is activated so that AND-gate G16 is enabled. Through this gate clock pulses are applied to the advance input of scanner AD3 which thus starts the scanning of memory M4. The successive interrogation results appear in memory register RE4. Logic network LNW'2, which detects the kind of information each time appearing in register RE4, activates its output *w*27 or *w*31 according to a directory or an equipment number being registered in register RE4. The activated output *w*27 of logic network LNW'2 enables AND-gates G43 and G42 via which the directory number parts U3...U0 and X9...X0 (binary form) registered in register RE4 are transmitted to the address distributor AD1 (FIG. 9) and to the register RE7, respectively. The directory number part U3...U0 received in the address distributor AD1 via the outputs *d* of AND-gates G43 is transcoded to the corresponding number part ABM (decimal binary form) which appears in register RE1 (FIG. 9 and 12) of memory M1. The activated output *w*31 of logic network LNW'2 enables coincidence detector CD'3 to compare the complete equipment numbers appearing in memory register RE4 to the equipment number registered in register RE2. Upon a comparison result being conclusive, output *w*27 of logic network LNW'2 is activated. Due to this, the AND-gates G42 and G43 are enabled and through these gates the required directory number ABMCDU is transmitted to the output register circuit ORC'. Part ABM of the above directory number is taken from the register RE1 whose content constitutes the transcoded directory number part U3...U0 last appeared in memory register RE4, whereas part CDU thereof is taken from register RE7 by converting its content X9...X0 in decimal-binary form (CDU) via code converter CC4. The eventual class information relative to the above line is transmitted to the output circuit ORC' either via AND-gates G46/47 next enabled by output $w$29 of logic network ORC' if this class information is contained in memory M4 or by the auxiliary translator (FIG. 13). In the latter case the relative address RAM5 to the first word of the associated cell in auxiliary translator memory M5 is transmitted to address distributor AD4 via the AND-gates G48 enabled by output $w$30 of logic network LNW'2.

The address distributor AD4 associated with auxiliary translator memory M5 (FIG. 13) receives the address RAM5, relative to the first word (class word) of a relevant cell thereof, from the first or second level translator of FIG. 11 or 12, respectively. Logic network LNW'3 whose output $w$32 is first activated enables AND-gates G49 via which the above first class word is transmitted to the output register circuit ORC'. If a second class word follows the first one, output $w'$20 of logic network LNW'3 is activated and enables AND-gate G22 until one clock pulse is applied to the advance input of address distributor AD4 which thus steps to its next count condition. The next class word appearing in memory register RE5 causes the activation of output $w$33 of logic network LNW'3 so that this second class word is transmitted to the output register circuit ORC' via AND-gates G50.

Concerning now the abbreviated dialing facility which is advantageously associated with pushbutton subsets, a subscriber enabled to perform such an abbreviated dialing must acknowledge this fact to the exchange to which his line is connected, e.g. by activating the eleventh button of its subset, before dialing the abbreviated number KL. The exchange input register circuit to which the above abbreviated number KL is communicated with the relevant indication, engages the aforementioned auxiliary translator to carry out the required translation, i.e. to communicate to the exchange output register circuit the relevant complete number N12...N1. This translation is performed by scanning the auxiliary translator memory M5 and by comparing each of the scanned abbreviated numbers KL with the input abbreviated number KL. Upon such a comparison being conclusive, the complete number N12...N1 following the stored number KL is transmitted to the output register circuit.

While the above detailed description of the translator arrangement considers specific and distinct circuits to perform the desired operations, it will be clear that the latter can be performed by means of a data processor provided with the usual essential elements, e.g. one memory unit, an accumulator register, a computing unit etc., as well as a program. In this manner some of the registers shown and described above, e.g. registers RE6 and RE7, will in fact be replaced by the memory and accumulator registers. The memory of the data processor, apart from the different line features, such as directory and equipment numbers, class information, special-normal line indications etc. stores the program instructions as well as other information.

While the principles of the invention have been described above in connection with specific apparatus, it is to be clearly understood that this description is made only by way of example and not as a limitation on the scope of the invention.

We claim:

1. A directory number-equipment number and equipment number-directory number translator arrangement for an automatic switching system including $n$ groups of substation lines, each of said $n$ groups including a plurality of substation lines, certain ones of said plurality of lines being normal lines having at least a predetermined relationship between their directory numbers and their equipment numbers and the remainder of said plurality of lines being special lines having at least a relationship between their directory numbers and their equipment numbers different than said predetermined relationship comprising:

detection means addressable by one of said directory numbers and said equipment numbers to produce a first signal indicating that an addressed line is normal and a second signal indicating that said addressed line is special;

special line translation means coupled to said detection means responsive to said second signal;

said directory and equipment numbers each including a first address portion identifying a particular group of said $n$ groups;

said special lines including first level special lines having their said first address portion of their said directory numbers and said equipment numbers related by a given one-to-one relationship, and second level special lines having their said first address portion of their said directory numbers and said equipment numbers related by a relationship different than said given relationship; and said special line translation means including at least a first translation stage having at most $n$ substages each assigned to said first level special lines of a different one of said $n$ groups, a second translation stage coupled to said first translation stage, said second translation stage being assigned in common to said second level special lines of said $n$ groups, first means, included in said first translator stage, responsive to said second signal to activate that one of said $n$ substages associated with that one of said $n$ groups containing said addressed special line to carry out the required translation; second means, included in said second translator stage, coupled to said first translator stage to detect a failure of said one of said $n$ substages to carry out said required translation because said addressed special line is not one of said first level special lines and to activate said second translator stage to carry out said required translation.

2. An arrangement according to claim 1, wherein:

each of said $n$ groups includes therein at least one unequipped line;

said detection means produces said second signal in response to the address of said one line; and said first and second translator stages fail to carry out said required translation.

3. An arrangement according to claim 1, wherein:

each of said substages and said second translator stage includes a cyclic scanning memory having a plurality of cells;

each of said plurality of cells having a variable number of rows each associated with at least a corresponding single special line, each of said plurality of cells having stored therein a first word representing said directory number of said associated special line and following words representing at least said equipment number corresponding to said directory number, each of said words including an index indicating the kind of information included in said word.

4. An arrangement according to claim 3, wherein:

said directory and equipment numbers are stored in said cyclic scanning memories in binary form.

5. An arrangement according to claim 1, further including an auxiliary translator stage cooperatively coupled to said first and second translator stages to cooperate in carrying out predetermined types of translations for said special lines.

6. An arrangement according to claim 5, wherein:

said auxiliary translator stage includes a cyclic scanning memory having a plurality of cells each having a variable number of rows coupled to said first and second translator stages;

each cell being associated with a corresponding special line of said first and second translator stages.